(12) United States Patent
Chauhan

(10) Patent No.: US 10,453,329 B2
(45) Date of Patent: Oct. 22, 2019

(54) SECURITY SYSTEM WITH GRAPHICAL ALARM NOTIFICATION

(71) Applicant: Ademco Inc., Golden Valley, MN (US)

(72) Inventor: Pradeep Chauhan, New Delhi (IN)

(73) Assignee: ADEMCO INC., Golden Valley, MN (US)

( * ) Notice: Subject to any disclaimer, the term of this patent is extended or adjusted under 35 U.S.C. 154(b) by 853 days.

(21) Appl. No.: 14/880,758

(22) Filed: Oct. 12, 2015

(65) Prior Publication Data

US 2017/0103644 A1 Apr. 13, 2017

(51) Int. Cl.
| | | |
|---|---|---|
| G06F 3/0481 | (2013.01) | |
| G06F 3/0484 | (2013.01) | |
| G06F 3/0486 | (2013.01) | |
| H04L 12/28 | (2006.01) | |
| G08B 29/02 | (2006.01) | |
| G08B 13/196 | (2006.01) | |
| G08B 25/00 | (2006.01) | |
| G08B 25/14 | (2006.01) | |

(52) U.S. Cl.
CPC ......... *G08B 29/02* (2013.01); *G06F 3/04817* (2013.01); *G06F 3/04847* (2013.01); *G08B 13/19682* (2013.01); *G08B 25/001* (2013.01); *G08B 25/14* (2013.01); *H04L 12/2816* (2013.01); *G06F 3/0481* (2013.01); *G06F 3/0486* (2013.01); *G06F 3/04845* (2013.01); *G08B 13/19678* (2013.01)

(58) Field of Classification Search
CPC .............. G06F 3/04817; G06F 3/0481; G06F 3/04845; G06F 3/0486; G06F 3/04847; G08B 13/19678; G08B 13/19682; G08B 25/001; G08B 25/14; G08B 29/02; H04L 12/2816

See application file for complete search history.

(56) References Cited

U.S. PATENT DOCUMENTS

| | | | |
|---|---|---|---|
| 8,732,091 | B1 | 5/2014 | Abhyanker |
| 8,823,508 | B2 | 9/2014 | Thiruvengada et al. |
| 9,159,210 | B2 | 10/2015 | Jones, Jr. et al. |
| 9,397,852 | B2 | 7/2016 | Sellers et al. |
| 9,495,860 | B2 | 11/2016 | Lett |

(Continued)

FOREIGN PATENT DOCUMENTS

| | | |
|---|---|---|
| EP | 0513601 A1 | 11/1992 |
| WO | 2014004911 A2 | 1/2014 |
| WO | 2014094981 | 6/2014 |

OTHER PUBLICATIONS

Extended European Search Report for EP Application No. 16193175.3, dated Feb. 15, 2017.

(Continued)

*Primary Examiner* — Ting Z Lee
(74) *Attorney, Agent, or Firm* — Husch Blackwell LLP

(57) ABSTRACT

A security system that provides an easy to read and understand alarm notification. In one example, if an alarm condition is detected by a particular sensor of a security system, the security system may be configured to display on a display of the security system and/or a mobile device a user-defined image object. Each image object may correspond to a user-defined region of a building space image, such as a floorplan.

16 Claims, 20 Drawing Sheets

(56) References Cited

U.S. PATENT DOCUMENTS

| | | | |
|---|---|---|---|
| 2002/0005866 A1* | 1/2002 | Gorham | G06F 16/954 715/760 |
| 2008/0309464 A1* | 12/2008 | Chihara | H04W 4/02 340/10.42 |
| 2011/0087988 A1* | 4/2011 | Ray | G06Q 10/06 715/771 |
| 2012/0194336 A1* | 8/2012 | Thiruvengada | G08B 13/19645 340/525 |
| 2014/0068486 A1* | 3/2014 | Sellers | G06F 3/04847 715/771 |
| 2015/0364029 A1 | 12/2015 | Hicks, III | |
| 2016/0011751 A1 | 1/2016 | Moses et al. | |
| 2017/0068419 A1* | 3/2017 | Sundermeyer | G06F 3/04815 |

OTHER PUBLICATIONS

Paradox Grafica User Quick Reference Manual, Grafica® Graphic LCD Keypad User's Quick Reference Guide, https://www.manualslib.com/manual/735364/Paradox-Grafica.html, Copyright 2002.

Grafica Graphic LCD Keypad Module, DNE-K07, http://www.paradox-riaszto.hu/letoltesek/telepitoknek123/DNEK07_eng.pdf, dated Dec. 2003.

Honeywell, Commercial Security, Vindicator Technologies, https://www.security.honeywell.com/All-Categories/integrated-security/vindicator-technologies, Copyright 2018.

Honeywell, Commercial Security, Vindicator® Site Commander, https://www.security.honeywell.com/product-repository/vindicator-site-commander, Copyright 2018.

\* cited by examiner

SECURITY SYSTEM WITH GRAPHICAL ALARM NOTIFICATION

TECHNICAL FIELD

The disclosure pertains generally to security systems, and more particularly to security systems with a graphical user interface.

BACKGROUND

Security systems provide an increased level of security in homes and other buildings. Security systems often include a centralized security controller operatively coupled to a number of sensors that are disposed throughout the home or building. When one of the sensors detects an alarm condition, the centralized security controller often displays a notification of the alarm condition on a display of a local keypad or the like. Often such displays have a limited size, or a limited number of characters that can be displayed, either of which can make it difficult to clearly identify the particular sensor from all of the sensors that triggered the alarm condition. For example, if a magnet contact sensor is installed on a window in a first bedroom on the second floor of a home, and that sensor detects an alarm condition, the security system may display the alarm notification "Alarm: WIN_1ST_BDR_2flr". However, such an alarm notification only describes the bedroom as the first bedroom, which then requires the user to know which of say three bedrooms on the second floor corresponds to the "first" bedroom. Also, such an alarm notification does not identify which window sensor in the first bedroom triggered the alarm. This can make it difficult for a user to trace the alarm condition to a particular sensor in the home or building. To discover the source of the alarm condition, the user may need to check each and every sensor in the general area indicated by the alarm notification. This can be time consuming and tedious. Also, because the particular sensor that triggered the alarm may not be readily identifiable, the user's response to the alarm condition may not be optimal. What would be desirable is to provide a security system that enables a user to easily see and understand the source of an alarm condition.

SUMMARY

The present disclosure pertains generally to security systems, and more particularly to security systems that enable a user to easily see and understand the source of an alarm condition. One example of the disclosure may be found in a security system installation tool that may be part of a security system controller or that may be a stand-alone tool that communicates with a security system controller. The security system installation tool may include a user interface including a display, a memory and a controller that is operatively coupled to the user interface and the memory. The controller may be configured to permit an installer, through manipulation of the user interface, to display a floor plan image of a building on the display of the user interface and to place individual sensor icons at corresponding locations on the displayed floor plan image. The installer may be permitted, through manipulation of the user interface, to define on the displayed floor plan image a user-defined region for each of at least some of the placed sensor icons. The controller may create an image object for each of the placed sensor icons that have a corresponding installer-defined region. An association that associates the placed sensor icon with the image object may be stored in the memory for each of the placed sensor icons that have a corresponding installer-defined region.

Another example of the disclosure may be found in a security system controller that includes a user interface including a display and a controller that is operatively coupled to the user interface. The controller may be configured to be operatively coupled to two or more security sensors that are disposed within a building space and to monitor the two or more security sensors for an alarm condition. The controller may also be configured to display on the display of the user interface a building space image of a building including two or more sensor icons each representing one of the two or more security sensors. The two or more sensor icons may be displayed on the building space image in positions that correspond to the actual physical locations of the corresponding one of the two or more security sensors within the building space. A memory may be operatively coupled to the controller for storing a corresponding image object for each of the two or more security sensors. Each image object may correspond to a user-defined region of the building space image. When the controller detects an alarm condition corresponding to one of the two or more security sensors, the controller is configured to display on the display of the user interface the image object that corresponds to the security sensor that triggered the alarm condition.

Another example of the disclosure may be found in a non-transitory computer-readable storage medium with an executable program stored thereon, wherein the executable program instructs a mobile device having a user interface. The mobile device may periodically check for a signal from a remote server that indicates an alarm condition from a sensor disposed within a building space. If an alarm condition is indicated, an image of only a portion of the building space that corresponds to the physical location of the sensor within the building is displayed on the user interface of the mobile device.

The above summary is not intended to describe each embodiment or every implementation of the present disclosure. Advantages and attainments, together with a more complete understanding of the disclosure, will become apparent and appreciated by referring to the following description and claims taken in conjunction with the accompanying drawings.

BRIEF DESCRIPTION OF THE DRAWINGS

The disclosure may be more completely understood in consideration of the following description of various illustrative embodiments in connection with the accompanying drawings, in which.

Figure 1:
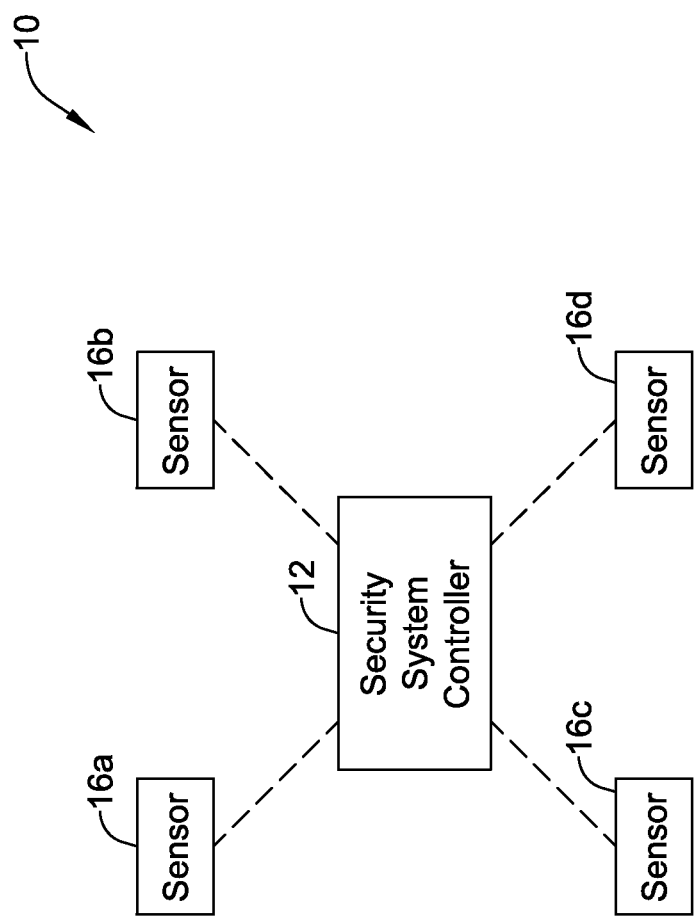
FIG. 1 is a schematic view of an illustrative security system in accordance with an embodiment of the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Devices or programs that are in communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus.

The present disclosure pertains generally to security systems that are configured to monitor and protect an individual's property. In some instances, a security system may protect a home, apartment or other building and provides alarms if something undesired is detected. Illustrative but non-limiting examples of alarm conditions for which a security system may monitor and report include intrusion, fire, smoke, carbon monoxide alarms, water leaks, and the like. Some security systems of the present disclosure provide a localized alarm and/or perhaps alarms on a smart phone application or the like. In some cases, a security system of the present disclosure may include remote monitoring. In remote monitoring, the security system, including any sensors that are disposed within the protected property, may be monitored from a remote monitoring location. A remote monitoring system, such as a remote monitoring service, may include a server or the like that receives information (e.g. alarms) from the security system, and in response, contacts the homeowner and/or the authorities as needed.

FIG. 1 is a schematic view of an illustrative security system 10 that may, for example, be installed a user's home. The illustrative security system 10 includes a security system controller 12 and several sensors 16a, 16b, 16c and 16d. While four sensors are illustrated, it will be appreciated that in some cases the security system 10 may include three or fewer sensors. More commonly, the security system 10 may include a much larger number of sensors. For example, in many security systems, there is a sensor placed on each window and door in order to detect whether the window or door is open or closed, and hence whether a possibly uninvited and unwanted intrusion has occurred. In some instances, the security system 10 may include other sensors, including but not limited to a camera or other visual recording device, a microphone that can detect, for example, the sound of glass breaking, voices, footsteps, door movement, and/or other sounds, a motion sensor, a smoke detector, a carbon monoxide (CO) detector, a water sensor, a proximity sensor and the like.

In some cases, the security system 10 may be hard-wired to at least some of the sensors 16a, 16b, 16c, 16d. In some instances, at least some of the sensors 16a, 16b, 16c, 16d may communicate wirelessly with the security system controller 12 using any desired communications protocol such as any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

Figure 2:
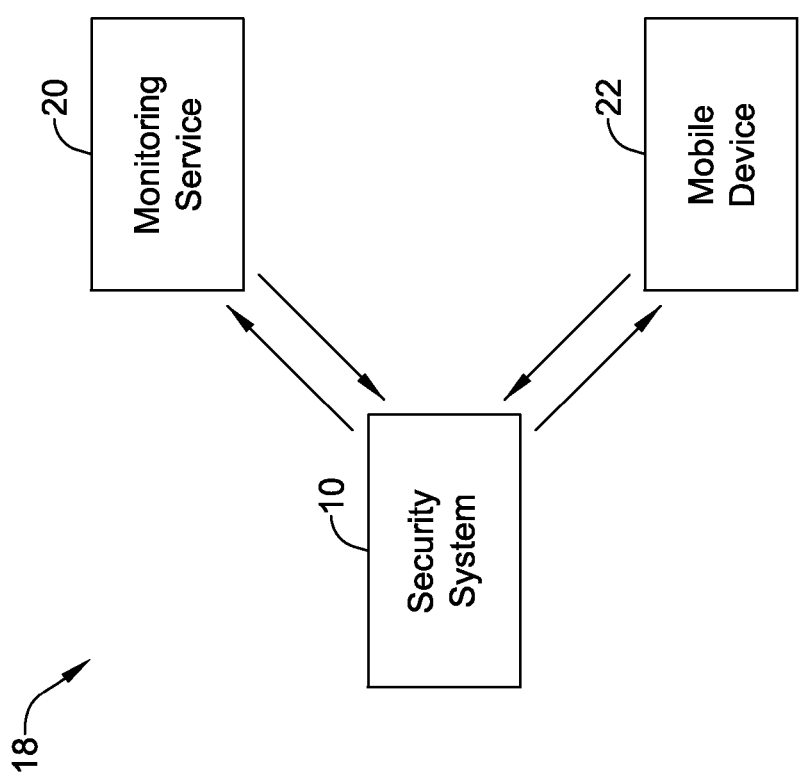
FIG. 2 is a schematic view of an illustrative security system in accordance with an embodiment of the disclosure.

In some instances, the security system 10 may communicate with devices that are remote from the home or building in which the security system 10 is installed. FIG. 2 is a schematic view of an illustrative system 18 that includes the security system 10 (FIG. 1). The system 18 includes a monitoring service 20 and a mobile device 22. In some instances, the monitoring service 20 may be a cloud-based monitoring system in which signals from the security system 10 are monitored at a location remote from the security system 10. If trouble is detected, the monitoring service 20 may contact the police or other local authorities. In some cases, the monitoring service 20 may additionally or alternatively contact a cell phone or other device registered to the owner of the security system 10, such as but not limited to the mobile device 22. In some instances, the security system 10 itself may directly contact the authorities and/or the homeowner.

In some cases, it will be appreciated that once the security system 10 has been physically installed in a building space as desired, there is a need to configure the security system 10. For example, the security system controller 12 may need to be informed of the location and identity of each sensor that is connected to the security system controller 12. In some cases, a security system installation tool may be used to help configure the security system 10. In some instances, as illustrated for example in FIG. 3, a security system installation tool 24 may be a stand-alone tool that may be temporarily operatively coupled to the security system controller 12, such as with a wired or wireless connection. As will be discussed, in some cases the security system installation tool 24 may be useful in configuring the security system controller 12. In some cases, as shown for example, in FIG. 4, an optional security system installation tool 26 may be part of a security system controller 28, and may be implemented as an application program or one or more menu screens, as desired. It will be appreciated that the security system controller 28 may be useable in a security system such as the security system 10, and may represent a replacement for the security system controller 12 discussed previously.

Figure 3:
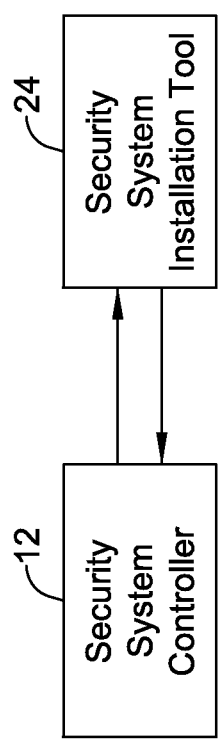
FIG. 3 is a schematic view of an illustrative security system in accordance with an embodiment of the disclosure.
Figure 4:
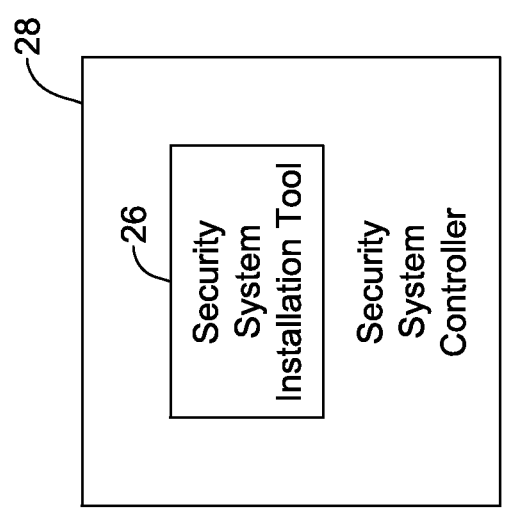
FIG. 4 is a schematic view of an illustrative security system controller useable in the security systems of FIGS. 1 and 2.
Figure 5:
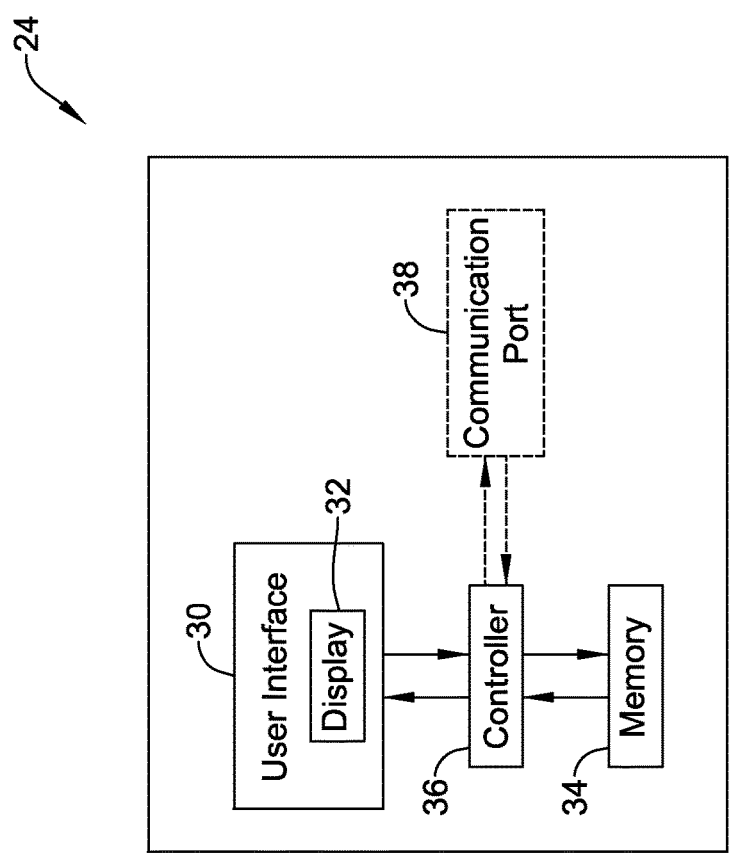
FIG. 5 is a schematic view of an illustrative security system installation tool useable in configuring the security systems of FIGS. 1 and 2.

FIG. 5 is a schematic view of the security system installation tool 26 shown in FIG. 3. While the security system installation tool 26 is discussed as being a stand-alone tool, it will be appreciated that if incorporated into a security system controller, the functionality of the security system installation tool will be largely the same. In FIG. 5, the security system installation tool 26 includes a user interface 30 that itself includes a display 32 and a memory 34. A controller 36 is operably coupled to the user interface 30 and to the memory 34. In some instances, the security system installation tool 24 may be implemented using a laptop computer, a tablet, a smart phone, a dedicated installation tool, and/or any other suitable device.

The controller 36 of the security system installation tool 26 may be configured to permit a user, through manipulation of the user interface 30, to display a floor plan image of a building on the display 32 of the user interface 30. In some cases, the controller 36 also permits the user to upload the floor plan image to the memory 34. The controller 36 may permit the user, through manipulation of the user interface 30, to place individual sensor icons at corresponding physical locations on the displayed floor plan image. For example, the sensor icons may represent the sensors 16a, 16b, 16c, 16d discussed previously as part of the security system 10 shown in FIG. 1, as well as the locations of those sensors 16a, 16b, 16c, 16d in the building.

In some instances, the controller 36 may be configured to permit the user (e.g. installer), through manipulation of the user interface 30, to define on the displayed floor plan image a user-defined region for each of at least some of the placed sensor icons. A user-defined region may, for example, correspond roughly to a room, but this is not required. In some cases, a user-defined region may, for example, be a portion of a larger space or room. For example, a building with an open floor plan may be divided into a user-defined region roughly corresponding to a kitchen, another user-defined region roughly corresponding to a living room adjacent the kitchen, and perhaps another user-defined region roughly corresponding to a formal dining area adjacent the living room. The controller 36 may then create a customized image object for each of the placed sensor icons. The customized image object for each of the placed sensor icons may be based, at least in part, on the portion of the displayed floor plan image that corresponds to the corresponding user-defined region. An association that associates the placed sensor icon with its corresponding image object may also be stored in the memory 34.

In some cases, the user-defined region for at least some of the placed sensor icon may each be defined by the user (e.g. installer) defining a polygon on the displayed floor plan image. In some instances, for example, the display 32 of the user interface 30 may be a touch screen display, and the user-defined region for at least some of the placed sensor icon may be each defined by touching the screen to define a polygon on the displayed floor plan image. In some cases, the controller 36 may permit the user, through manipulation of the user interface 30, to pan, zoom and/or resize the displayed floor plan image when defining the user-defined regions. In some instances, the controller 36 may be configured to permit the user, through manipulation of the user interface 30, to input, upload and/or auto-detect a list of enrolled sensors and to display an individual sensor icon for each of the enrolled sensors, and to drag the individual sensor icons to locations on the displayed floor plan image that correspond to actual physical locations of the enrolled sensors.

In some cases, the security system installation tool 24 may include a communication port 38 that is operably coupled to the controller 36 to permit the security system installation tool 24 to communicate with other devices. For example, in some cases, the communication port 38 may be configured to communicate with a remote server, such as may be part of the monitoring service 20 (FIG. 2). In some cases, the communication port 38 may be configured to communicate with a security system controller (such as the security system controller 12 of FIG. 1) via a wireless or wired link, and to upload to the security system controller the locations, the user-defined regions and/or the stored associations for each of the placed sensor icons.

Figure 6:
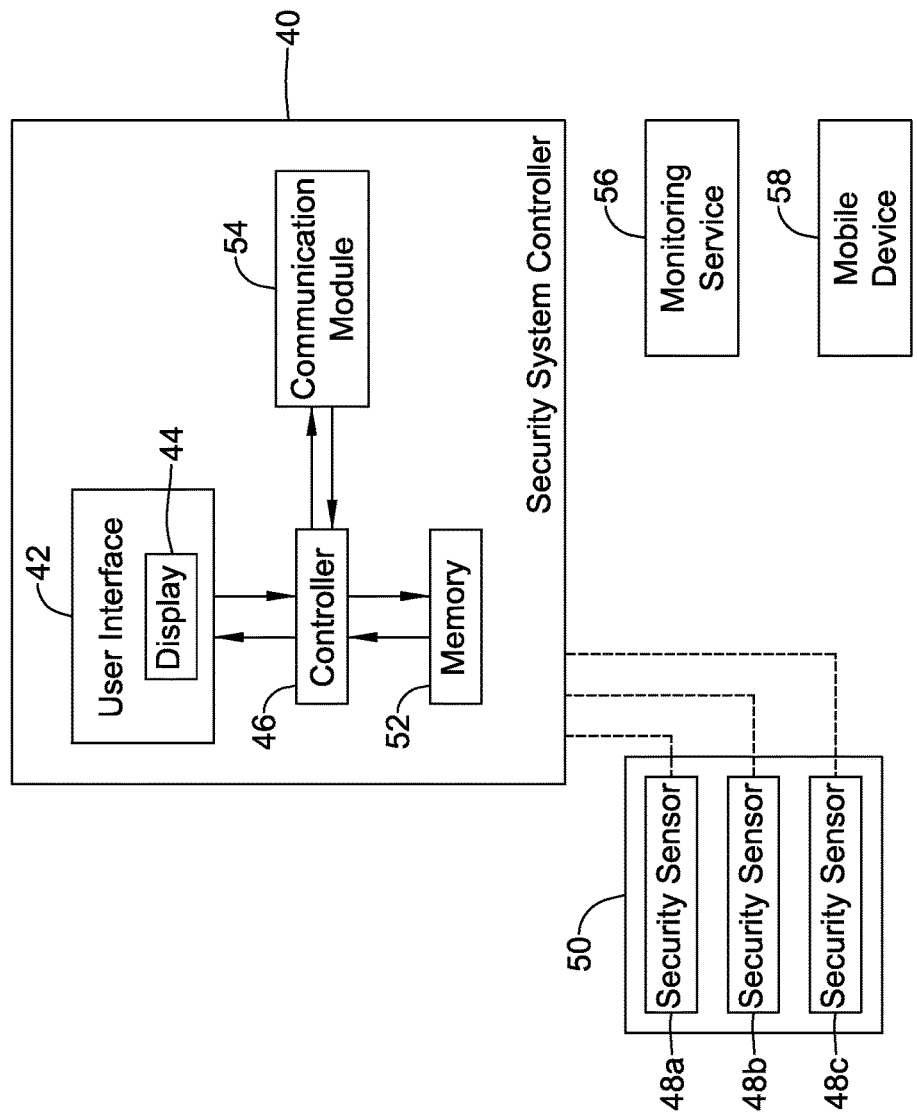
FIG. 6 is a schematic view of an illustrative security system in accordance with an embodiment of the disclosure.

FIG. 6 is a schematic view of another illustrative security system controller 40. In some cases, the security system controller 40 may be configured to communicate with a stand-alone security system installation tool 24 (FIG. 5). In some cases, the security system controller 40 may itself incorporate the functionality of the security system installation tool (as noted in FIG. 4). The illustrative security system controller 40 may include a user interface 42 including a display 44 and a controller 46 that is operatively coupled to the user interface 42. In some cases, the controller 46 may be configured to be operatively coupled to two or more security sensors 48a, 48b, 48c that are disposed within a building space 50. While three security sensors 48a, 48b, 48c are illustrated, it will be appreciated that the controller 46 may be configured to be operably coupled to any number of security sensors. The controller 46 may also be configured to monitor the security sensors 48a, 48b, 48c for an alarm condition. It is contemplated that the controller 46 may or may not be physically located within the building space 50.

In some cases, the controller 46 may be configured to display on the display 44 of the user interface 42 a building space image of building space 50 including two or more sensor icons each representing one of the two or more security sensors 48a, 48b, 48c. The two or more sensor icons may be displayed at locations on the building space image that correspond to the physical locations of the two or more security sensors 48a, 48b, 48c within the building space 50. In some cases, the building space image may be, for example, a floor plan of the building space 50. A memory 52 may be operably coupled to the controller 46 and may store a corresponding image object for each of the two or more security sensors 48a, 48b, 48c. In some cases, each image object may correspond to a user-defined region of the building space image. In some cases, at least some of the image objects correspond to a user-defined sub-region of the floor plan. In some instances, for example, the user-defined sub-region of the floor plan may correspond to a room or a portion of a room on the floor plan, and the sensor icons may be placed at corresponding locations on the user-defined sub-region of the floor plan.

When the controller 46 detects an alarm condition corresponding to one of the two or more security sensors 48*a*, 48*b*, 48*c*, the controller 46 may be configured to display on the display 44 of the user interface 42 the image object that corresponds to the security sensor that triggered the alarm condition. In some cases, the controller 46 may be operatively coupled to a communications module 54 that enables the security system controller 40 to communicate with remote devices, including but not limited to one or more of a monitoring service 56 and/or a mobile device 58. In some cases, in response to a detected alarm condition, the controller 46 may be configured to transmit the image object that corresponds to the security sensor that triggered the alarm condition to a mobile device such as the mobile device 58. In some cases, the mobile device 58 may be a smartphone running a security application, and in response to receiving the transmitted image object, the security application may display the image object. In some cases, the controller 46 may additionally or alternatively transmit an alarm message to a remote monitoring service 56.

Figure 7:
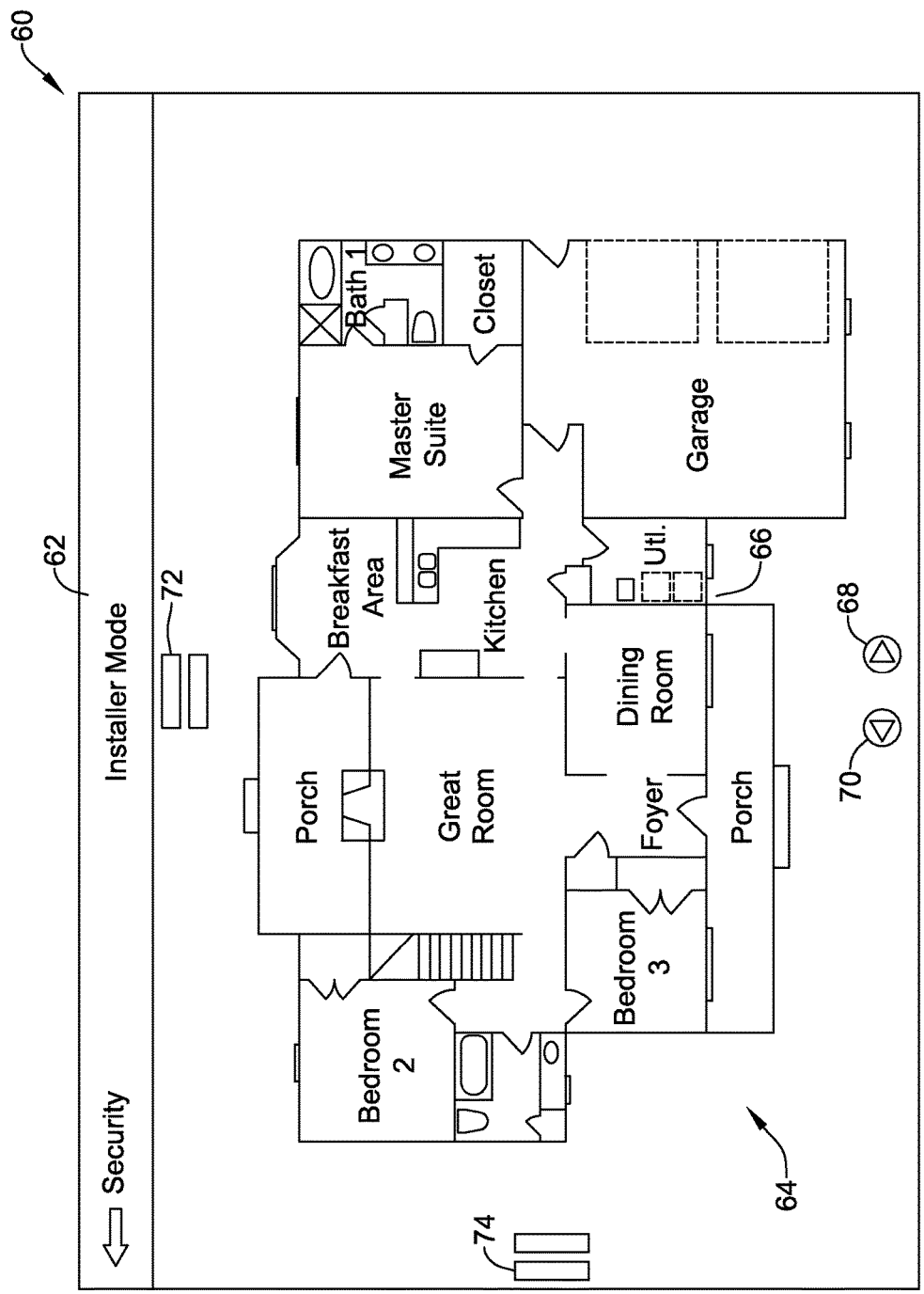
FIGS. 7 through 11 illustrate example screens that may be displayed by the illustrative security system controller of FIG. 4 or by the illustrative security system installation tool of FIG. 5 during an installation process.

FIGS. 7 through 11 are illustrative screens that may be displayed, for example, on the display 32 of the security system installation tool 24 (FIG. 5), and/or on the display 44 of the security system controller 40 (FIG. 6). These screens show particular features of an illustrative installer mode in which the physical particulars of the security system 10 are defined and then uploaded into the security system 10. FIG. 7 shows an illustrative screen 60 that includes a status bar 62 that, as shown, indicates the device is in an "installer mode". In some cases, the "installer mode" may be distinct from other modes, such as a ready to arm and/or armed mode, as will be illustrated in subsequent Figures. A central portion 64 of the illustrative screen 60 displays a floor plan 66 that may have been previously uploaded to the device. It will be appreciated that the floor plan 66 may be considered as a drawing of the floor, an engineering drawing, a blueprint, and the like. The illustrative screen 60 includes a forward button 68 and a back button 70 that may, for example, be used to scroll between different floor plans, such as different levels of a multi-level home. For a single level home, the forward button 68 and the back button 70 may be grayed out or otherwise not displayed or not functional. As can be seen, the illustrative screen 60 also includes pull-down buttons 72 and 74 that, as will be shown, can be used to access additional functionality.

Figure 8:
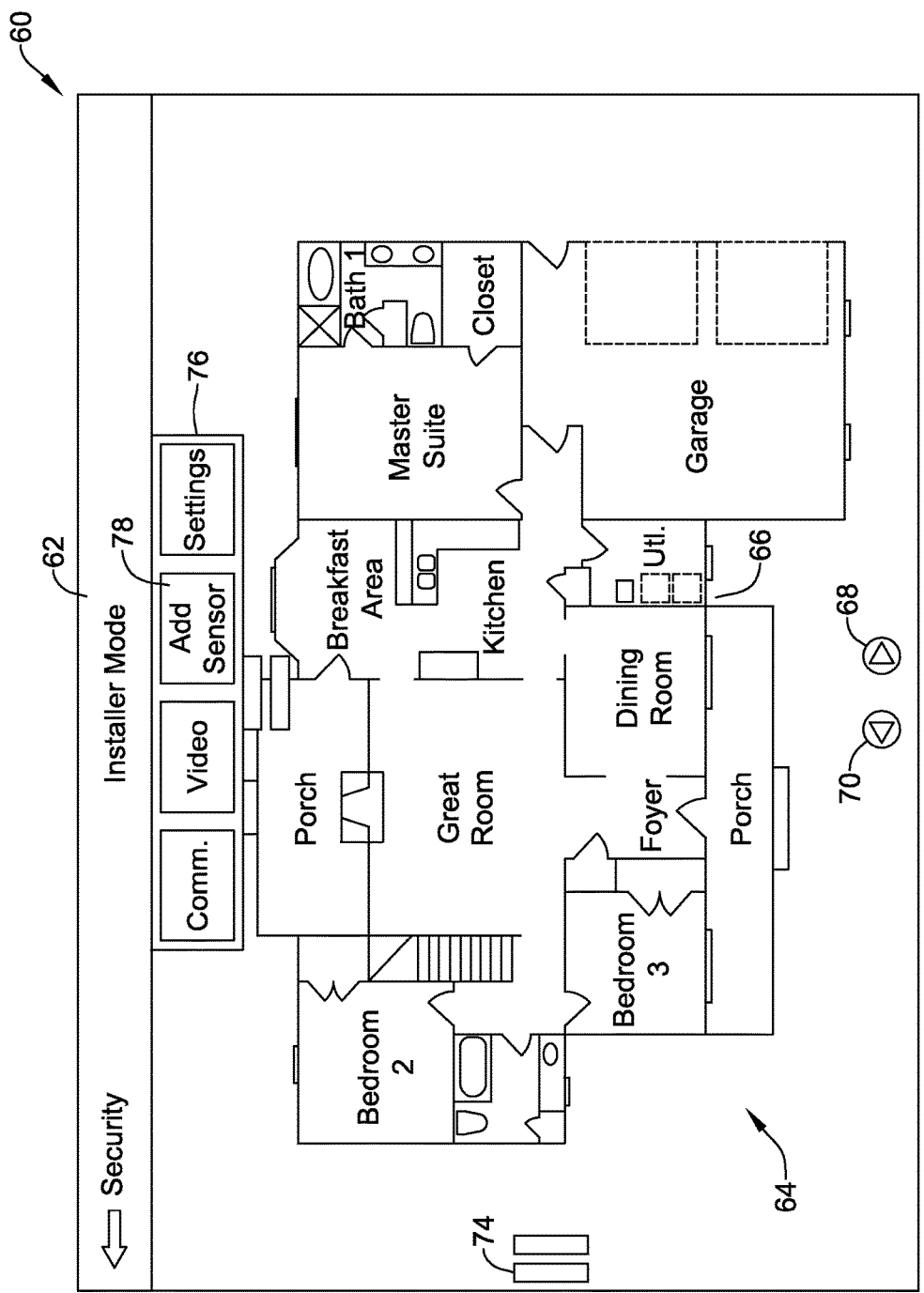
Figure 9:
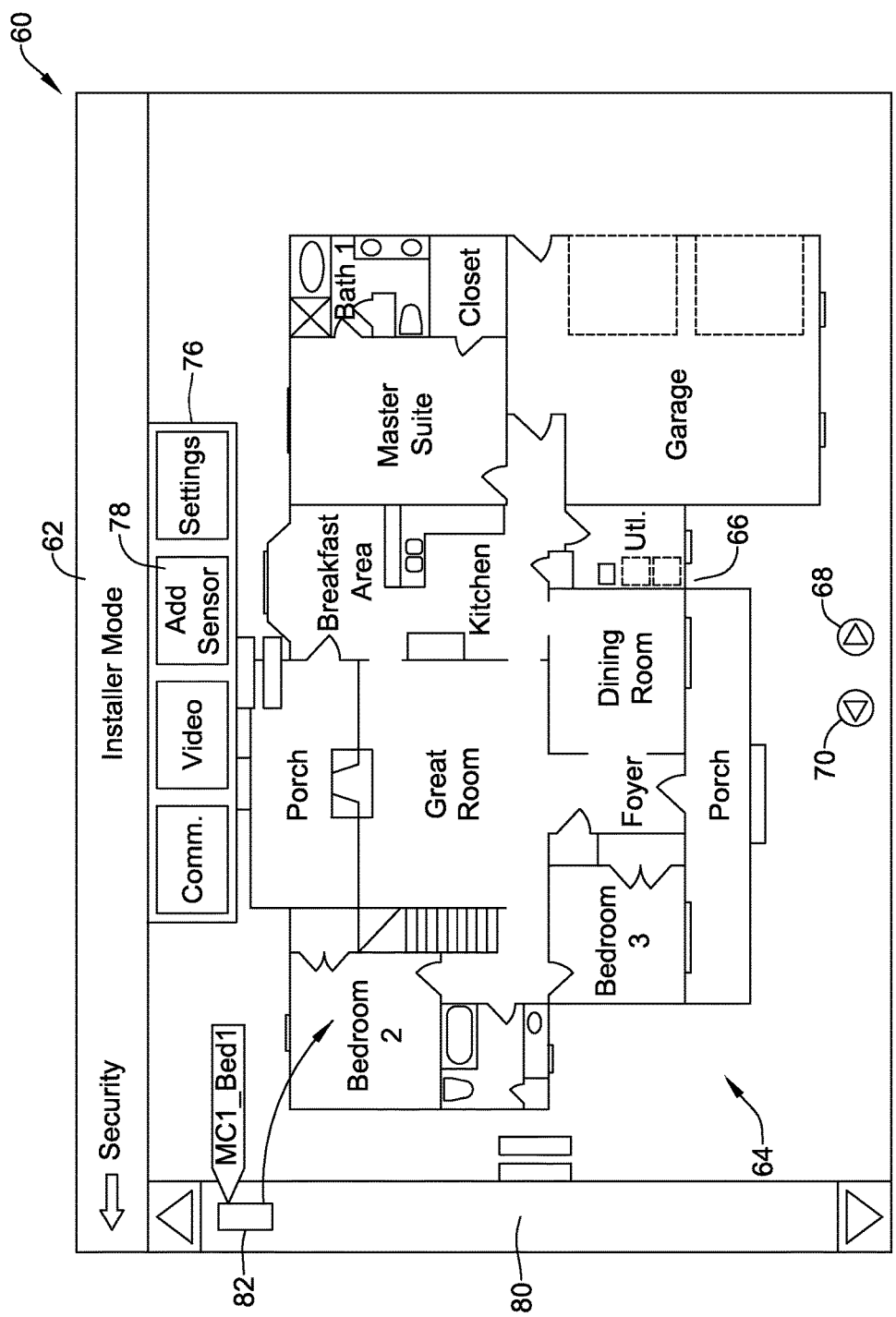

Turning to FIG. 8, it can be seen that a pull-down menu 76 has been accessed by clicking on the pull-down button 72 of FIG. 7. The pull-down menu 76 includes several buttons, including an ADD SENSOR button 78. Selecting the ADD SENSOR button 78, such as by touching or clicking on the ADD SENSOR button 78, may cause the screen 60 to display as shown in FIG. 9. In FIG. 9, the pull-down button 74 has been replaced by a sensor section 80 that displays one or more sensors that correspond to physical sensors of the security system, and that can be dragged-n-dropped onto the floor plan 66 in positions that corresponding to their actual physical location within the building space 50 (FIG. 6). A single sensor 82, labeled MC1_BED1, is shown disposed within the sensor section 80. However, it is contemplated that multiple sensors may be shown here. In some cases, a list of enrolled sensors may be inputted, uploaded and/or auto-detected, and then the sensor section 80 may be populated with the list. It is contemplated that the user (e.g. installer) may change one or more properties of the sensors by clicking to touching the sensor icon. A properties menu may then be displayed (not shown), wherein the user may change property values, such as type of sensor, manufacturer, name of the sensor, sensitivity thresholds of the sensor, and/or any other suitable property.

Figure 10:
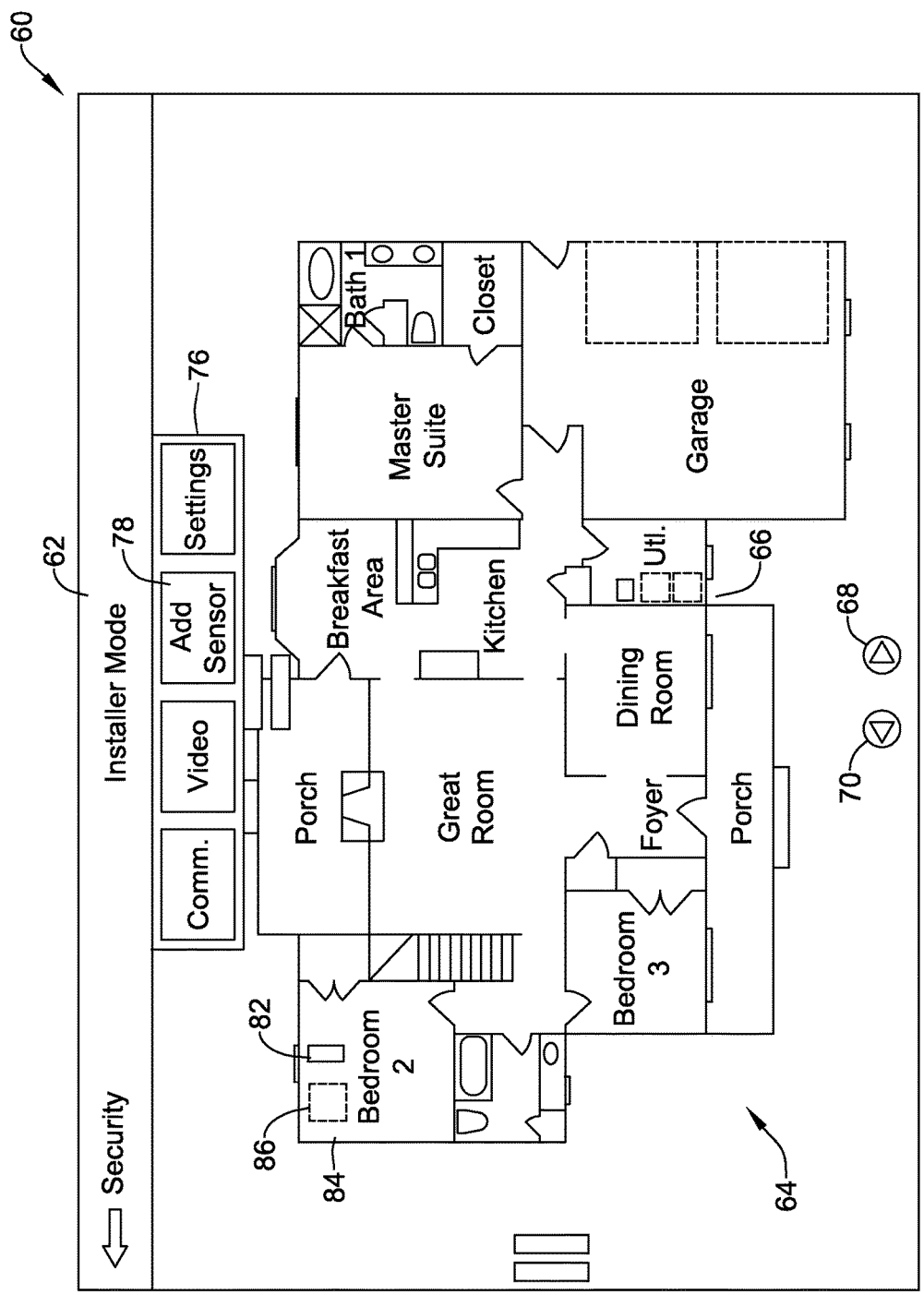
Figure 11:
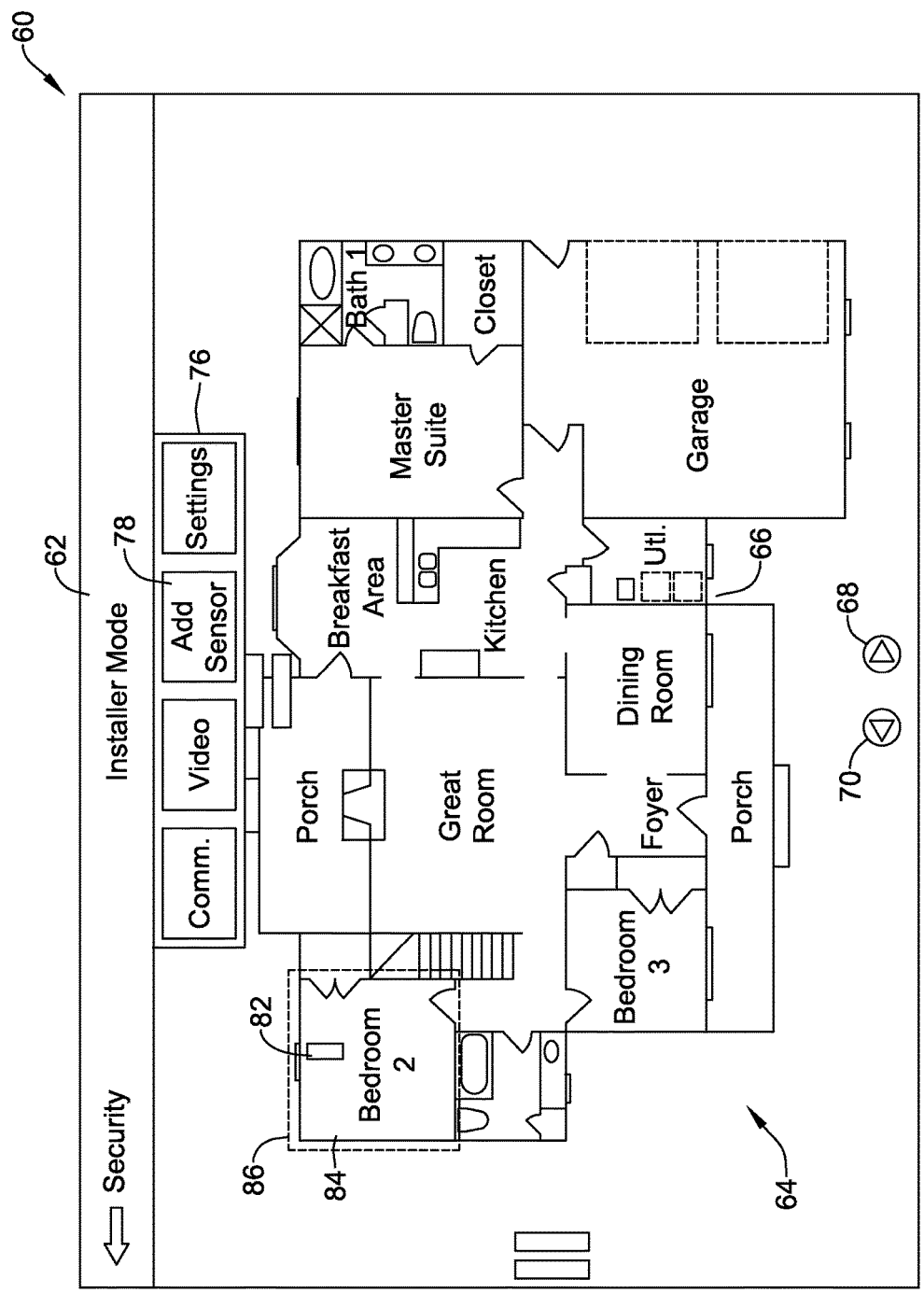

FIG. 10 shows that the sensor 82 of FIG. 9 having been dragged-n-dropped, or otherwise positioned, within a bedroom 84, which as illustrated is disposed in the upper left corner of the floor plan 66. The sensor 82 can be seen on the floor plan 66 as a sensor icon. Placing the sensor 82 into position, such as in the bedroom 84 in this particular case, causes the display of a scalable box 86. The scalable box 86 may be used to indicate the user-defined region that corresponds to the particular sensor 82. In some cases, the scalable box 86 may be made bigger or smaller by clicking on the box 86 and dragging the mouse in one direction or another, or by dragging a finger on a touch screen display, for example. In FIG. 11, the box 86 has been made larger such that the box roughly corresponds to the size of the bedroom 84. In some cases, the controller 36 (FIG. 5) or the controller 46 (FIG. 6) will create an image object representing the selected region as outlined by the box 86. In one example, the controller 36 and/or the controller 46 may cut or crop a portion of the floor plan 66 that corresponds to the box 86, and may save that portion of the floor plan 66 as the "image object" that corresponds to the sensor 82. The scalable box 86 need not be a rectangle. For example, it is contemplated that a user (e.g. installer) may, for example, define vertexes of any suitable shape, and/or use any other suitable technique for defining the user-defined region for each of at least some of the placed sensor icons.

Figure 12:
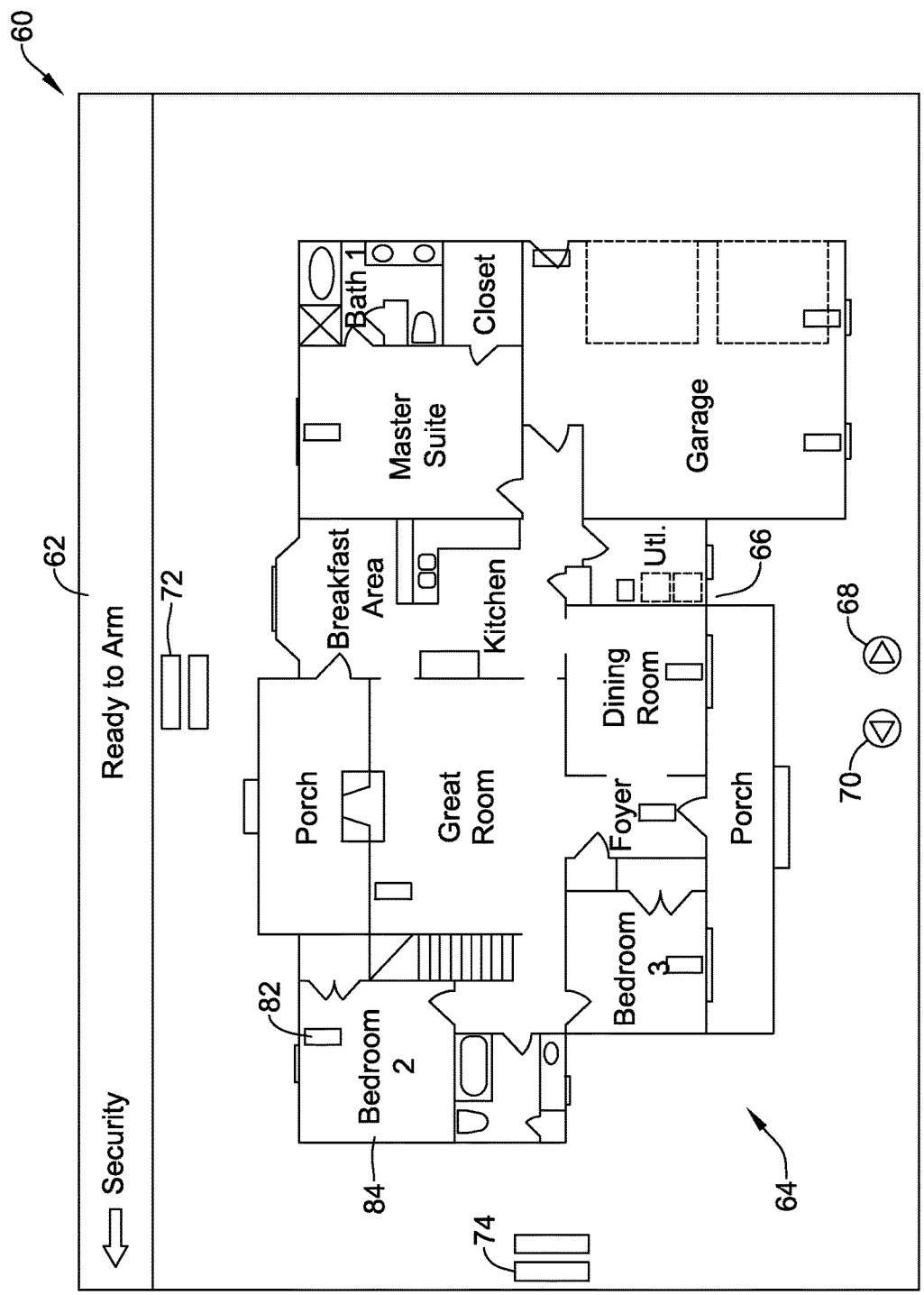
FIGS. 12 through 15 illustrate example screens that may be displayed by the illustrative security system controller.

FIGS. 12 through 15 are screen captures showing illustrative screens that may be displayed, for example, on the display 32 of the security system installation tool 24 (FIG. 5), and/or on the display 44 of the security system controller 40 (FIG. 6), after various sensor icons are placed. As seen in FIG. 12, the status bar 62 indicates that the system is in a ready to arm mode. The sensor 82, whose sensor icon placement was illustrated in FIGS. 7-11, can be seen in the bedroom 84. Additional sensor icons can be seen positioned in various locations on the floor plan 66 in FIGS. 12-15.

Figure 13:
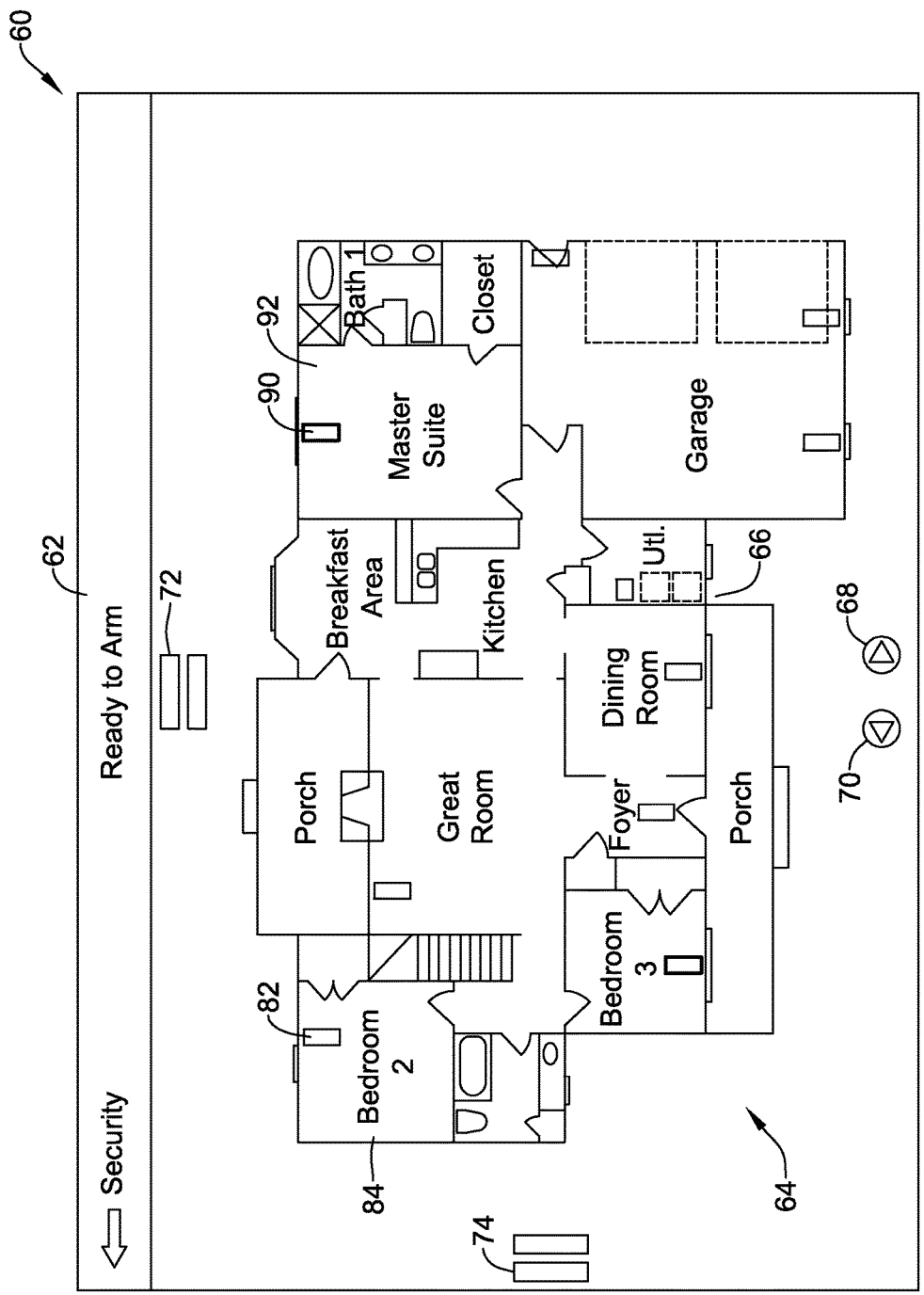
Figure 14:
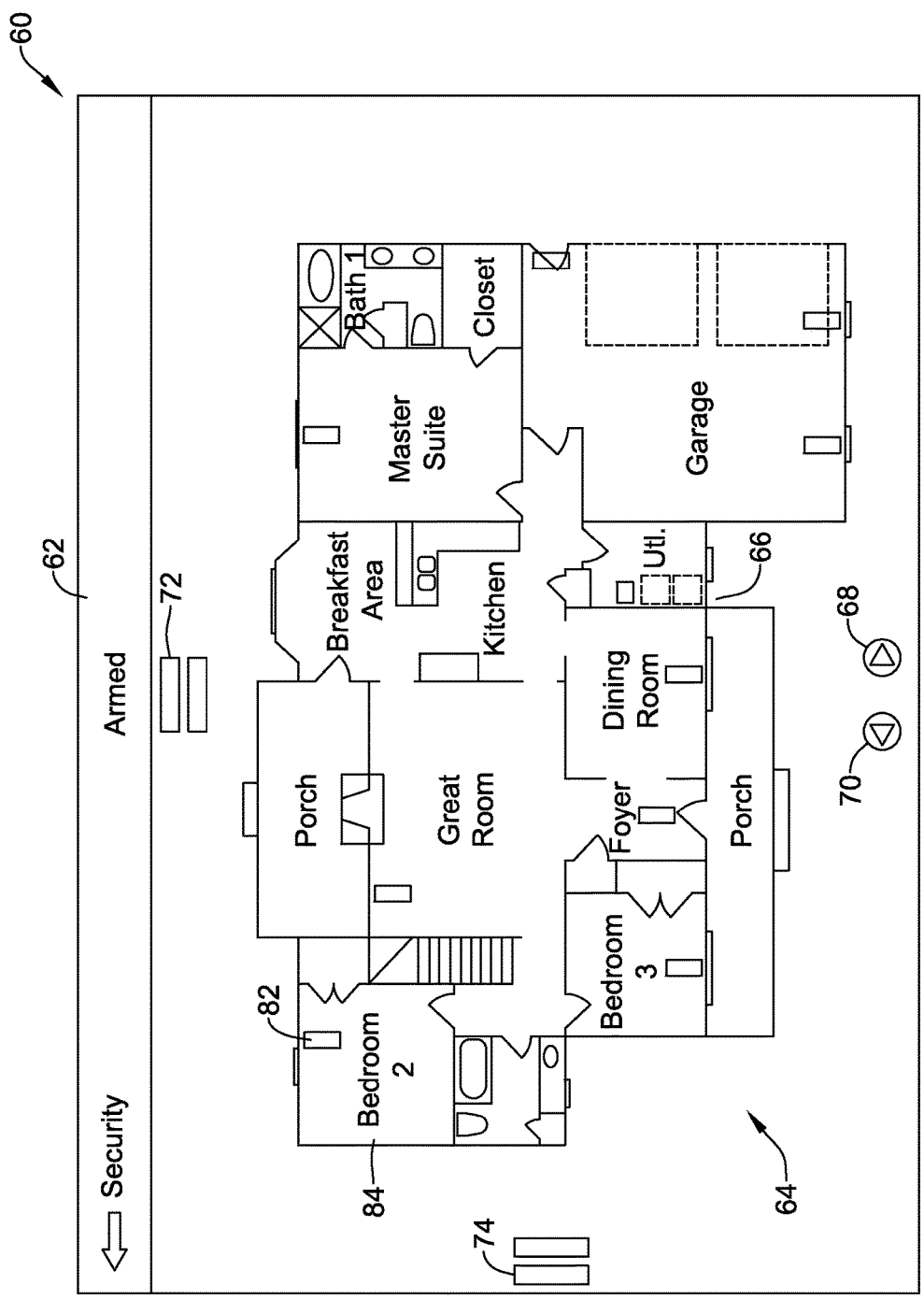

In FIG. 13, a sensor icon 90 located in a master suite 92 is illuminated or otherwise indicating that a corresponding window is open in the master suite 92. The homeowner may, for example, go close the window before arming the system, or perhaps may simply instruct the system to ignore the open window. FIG. 14 shows the system armed, as indicated by the status bar 62. In FIG. 14, it will be appreciated that the open window indicated by the sensor icon 90 in the master suite 92, has been resolved prior to arming the system.

Figure 15:
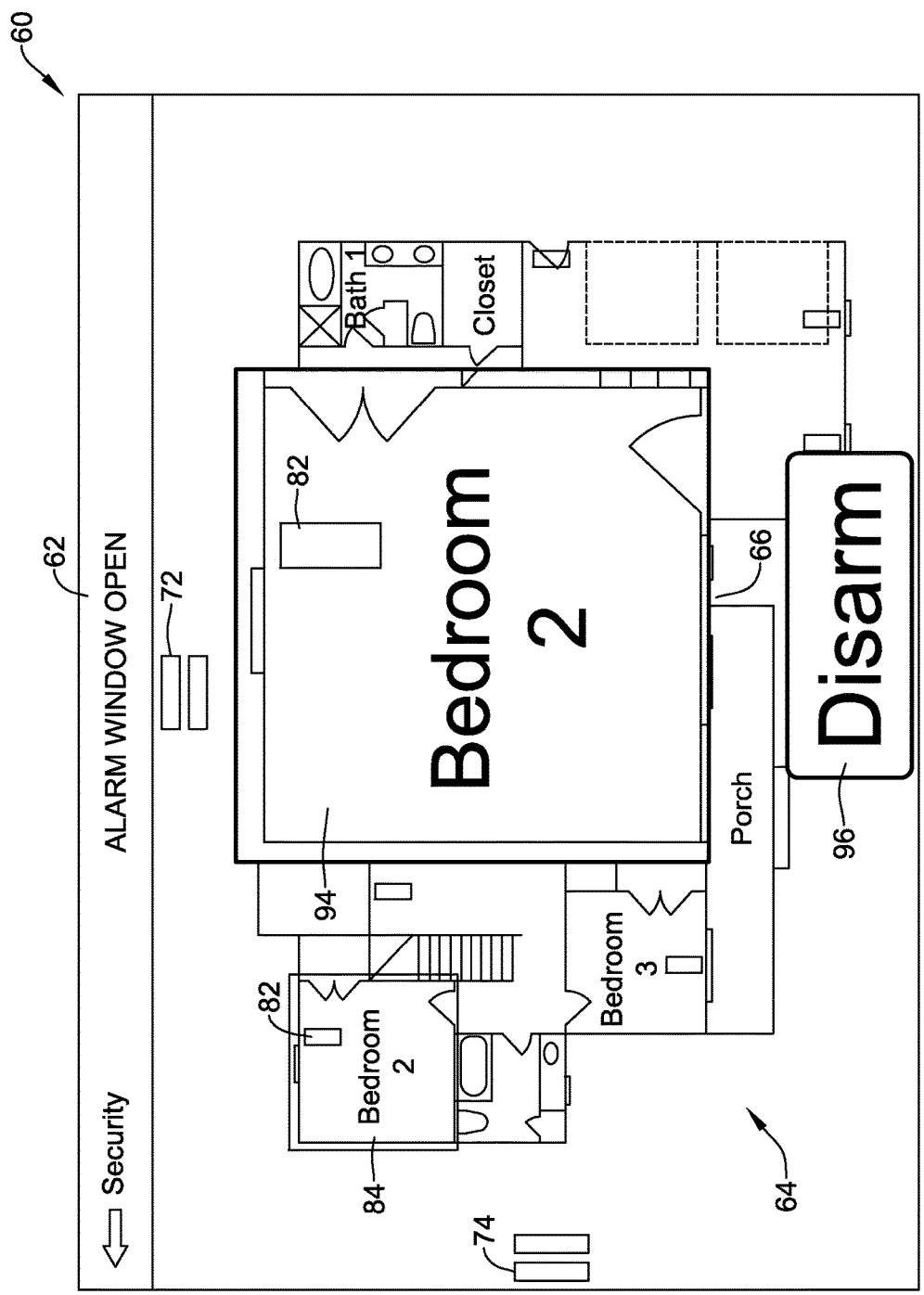

In FIG. 15, the system has been armed, as indicated by the status bar 62. FIG. 15 illustrates how the controller 36 and/or the controller 46 may react when a sensor detects an alarm condition. In the example shown, the sensor 82, disposed within the bedroom 84 and configured to monitor the window in bedroom 84, has detected an alarm condition. This may be as simple as an open window, or as ominous as a broken window that someone is trying to climb through. In response, the controller 36 and/or the controller 46 may display an enlarged view of the image object 94 previously defined by the user (e.g. installer) and linked or otherwise associated with the sensor 82. In the example shown, the image object 94 graphically represents a physical space that corresponds to the location of the sensor that triggered the alarm condition. The sensor icon 82 may also be highlighted. For example, the sensor icon 83 may be colored red, blink or otherwise direct the user attention toward the sensor icon 83. If the region of the building encompassed by the image object 94 also included another sensor (not shown in FIG. 15) that was not detecting an alarm condition, the sensor icon for that other sensor may not be highlighted in the image object 94. Thus, the user may be able to quickly and accurately identify the particular sensor that triggered the alarm condition as well as its location in the building.

In some cases, the controller 36 and/or the controller 46 may also displays a DISARM button 96, which permits the user (e.g. homeowner) the opportunity to easily cancel the alarm if and when they determine the alarm to be a false alarm, such as one of their kids opening their bedroom window to get a little fresh air.

In some embodiments, information pertaining to the status of the security system 10 may be communicated to a mobile device such as a smartphone or tablet, and may be displayed on the mobile device, such as the mobile device 22 (FIG. 2) or the mobile device 58 (FIG. 6). FIGS. 16 through 20 are screen captures showing illustrative screens that may be displayed, for example, on a display of a mobile device such as a smartphone or a tablet running a security application that is in communication with the security system 10. In some instances, the mobile device may communicate directly with the security system 10. In some cases, the mobile device may communicate with the monitoring service 20 (FIG. 2) or the monitoring service 56 (FIG. 6), which may in turn communicate with the security system 10.

Figure 16:
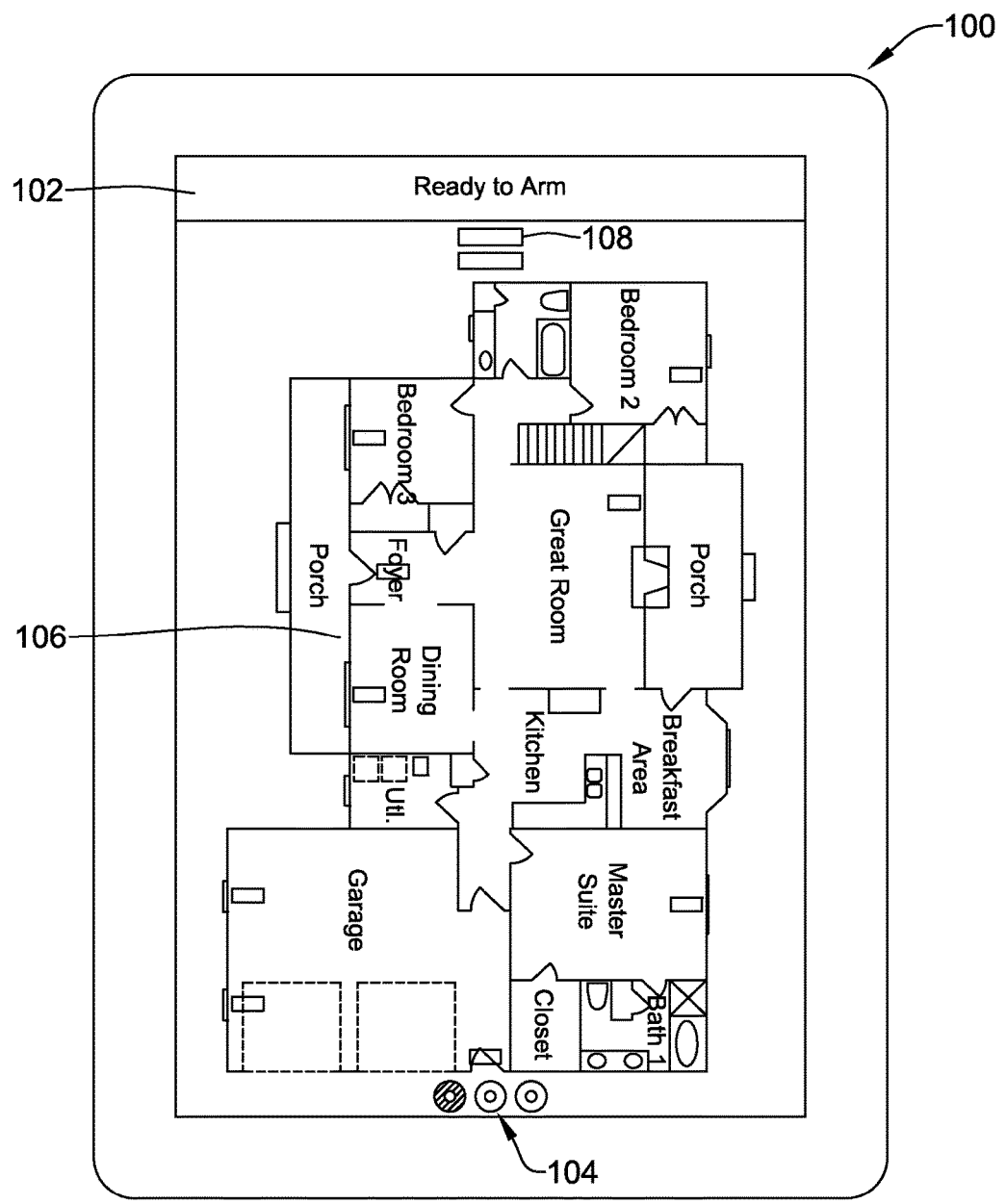
FIGS. 16 through 20 illustrate example screens that may be displayed by a mobile device operating a security application in communication with the illustrative security system controller of FIG. 4.
Figure 17:
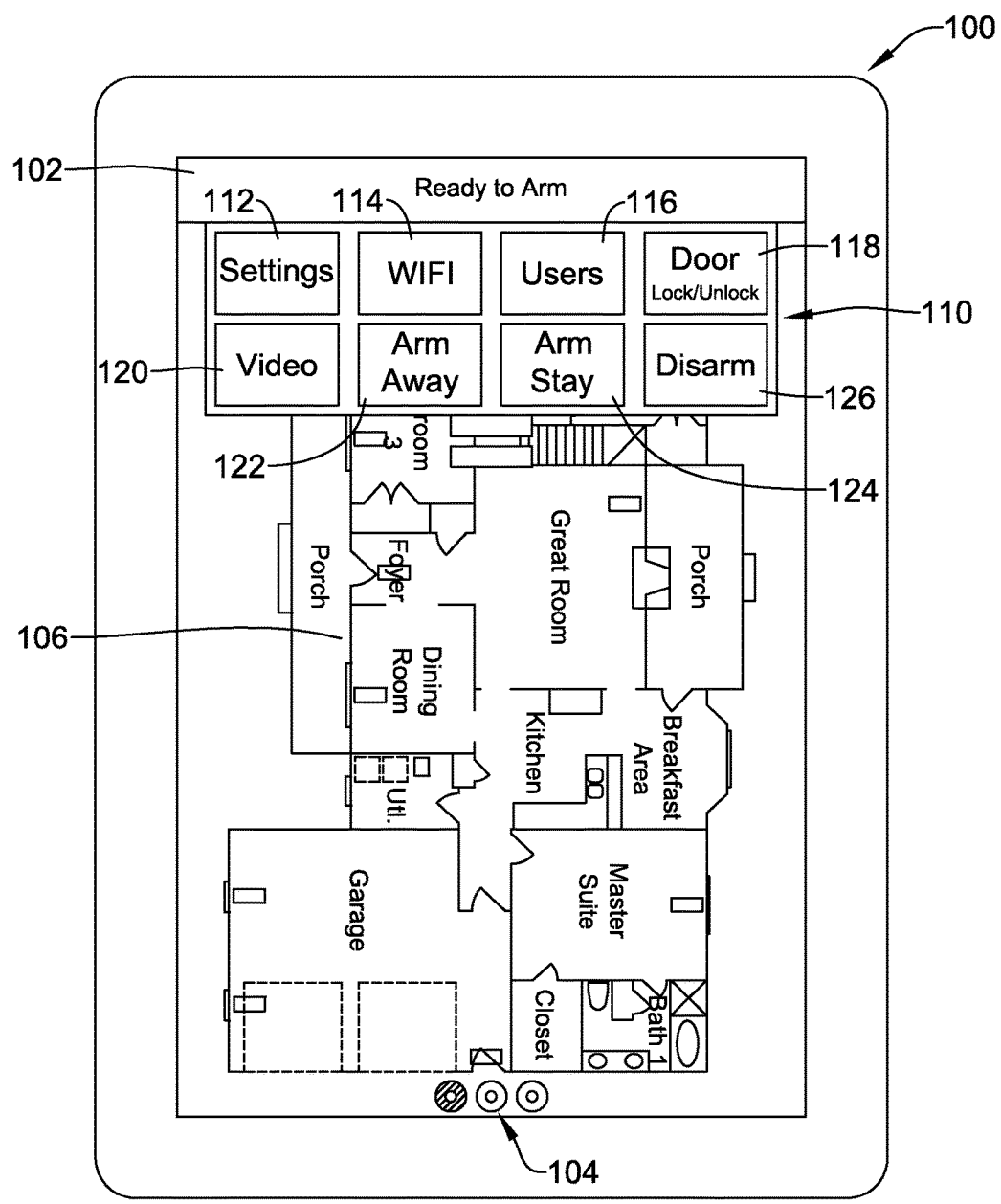

In FIG. 16, a screen 100 includes a status bar 102 that indicates the current status of the system as well as a selector 104 that allows a user to move between individual floor plans 106. It will be appreciated that the screen 100 provides information on the mobile device that is similar to that shown in FIG. 12. A pull down button 108 may be selected to provide additional tools. Selecting the pull down button 108 may cause a menu 110 to be displayed, as shown in FIG. 17. It will be appreciated that the menu 110 provides a user with a number of options to choose from, including a SETTINGS button 112, a WIFI button 114, a USERS button 116, a DOOR UNLOCK button 118, a VIDEO button 120, an ARM AWAY button 122, an ARM STAY button 124 and a DISARM button 126.

Figure 18:
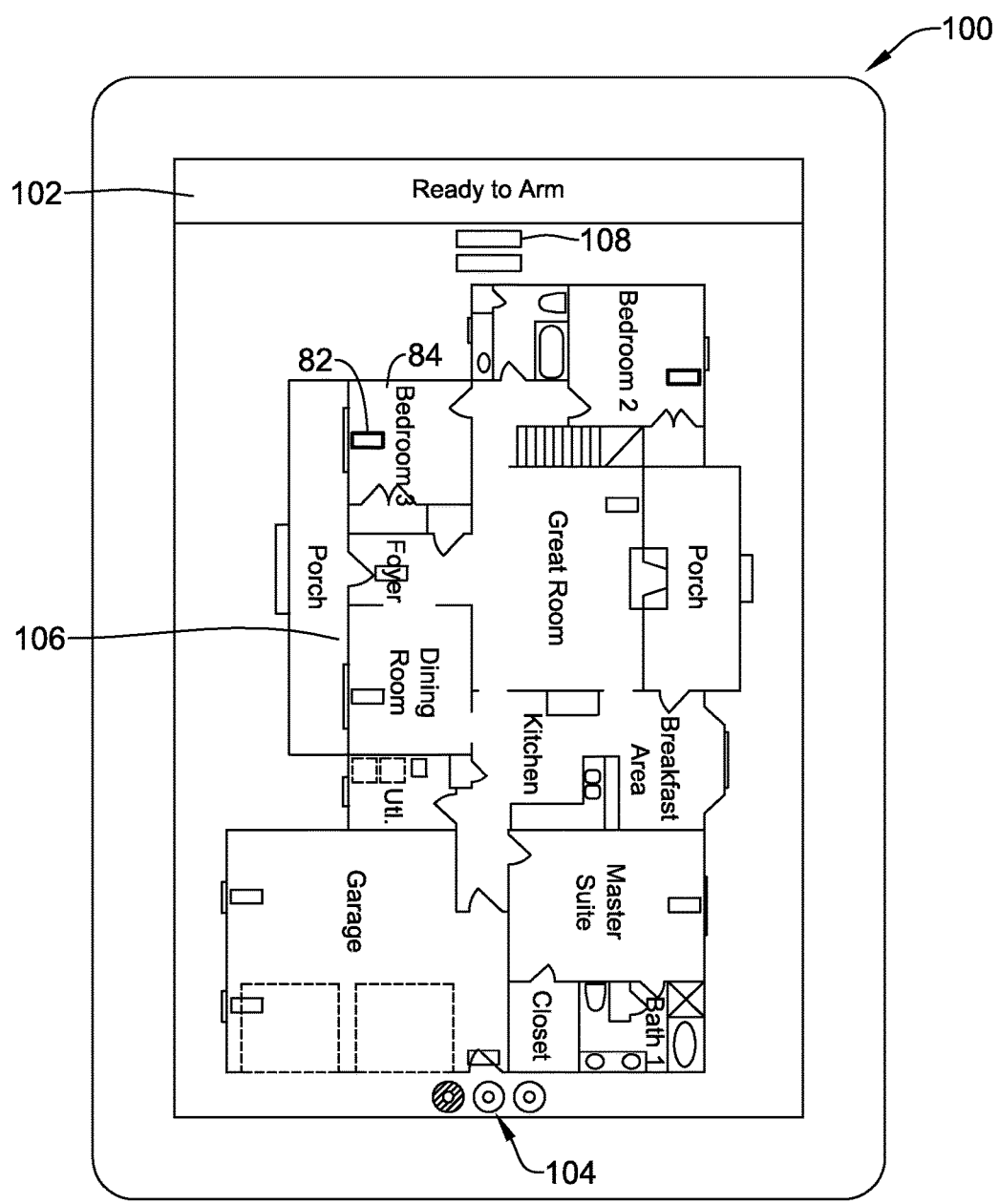
Figure 19:
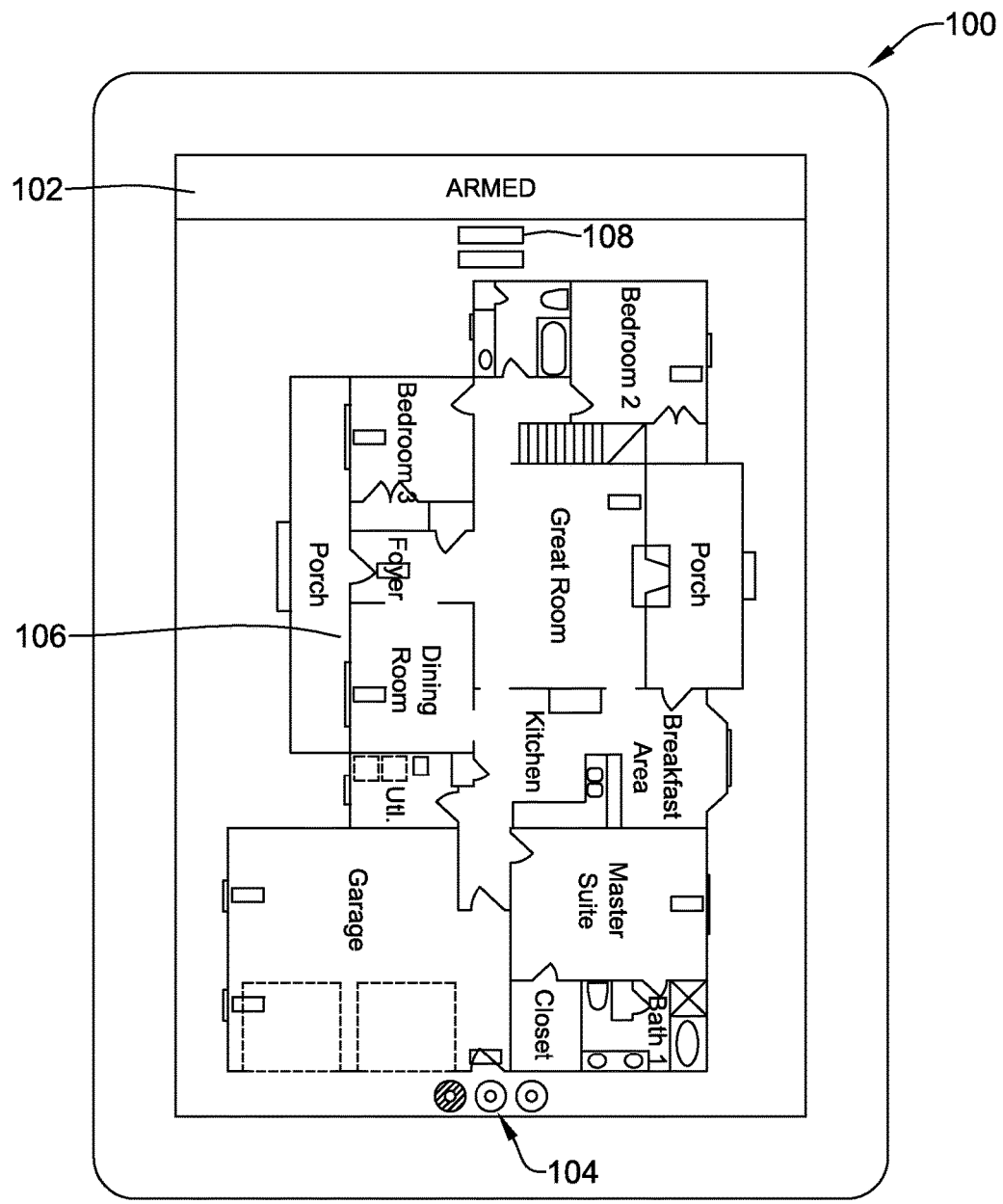

Turning to FIG. 18, which is a view similar to that of FIG. 13, it can be seen that the sensor 82 has been placed in the bedroom 84, and that all of the other sensors have also been placed. The sensor icon 90 that is located in the master suite 92 is illuminated or otherwise indicating that a window is open in the master suite 92. The homeowner may, for example, go close the window before arming the system, or perhaps may simply instruct the system to ignore the open window. In FIG. 19, the system has been armed, as indicated by the status bar 102, by an individual selecting either the ARM AWAY button 122, if they are going to be away from home, or the ARM STAY button 124 if they are going to be at home, and are perhaps going to bed for the night. This is similar to the view shown in FIG. 14.

Figure 20:
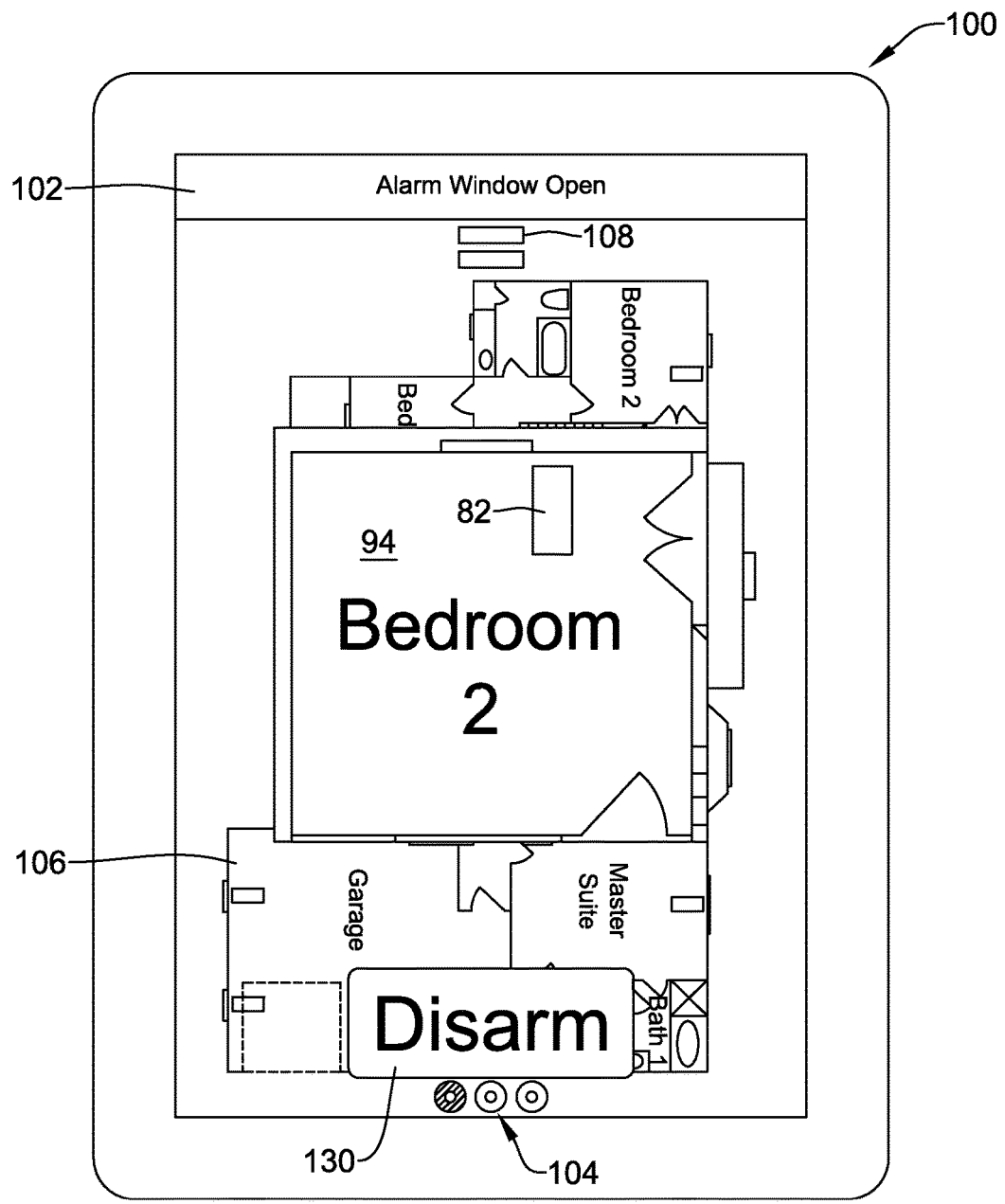

FIG. 20 provides a screen 100 that is similar to that shown in FIG. 15, in which an alarm condition has been detected. A window has been found to be open, as shown and described in the status bar 102. The sensor 82, disposed within the bedroom 84, is indicating a problem. This may, for example, be as simple as an open window, or as ominous as a broken window that someone is trying to climb through.

In response, an enlarged view of an image object 94 that graphically represents the physical space corresponding to the location of the sensor 82 is displayed, thereby providing an easy to understand graphical indication of the alarm condition and its location. A DISARM button 130 may also be displayed, which permits the homeowner the opportunity to easily cancel the alarm if and when they determine it to be a false alarm, such as one of their kids opening their bedroom window to get a little fresh air.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A security system installation tool comprising:
 a user interface including a display;
 a memory; and
 a security system installation tool controller cooperatively coupled to the user interface and the memory, wherein the security system installation tool controller is configured to:
  display a floor plan image of a building on the display;
  responsive to first user manipulation of the user interface, place a sensor icon at a corresponding location on the floor plan image;
  responsive to a second user manipulation of the user interface selecting a part of the floor plan image, define a user-defined region for the sensor icon superimposed on the floor plan image, wherein a size of the user-defined region is scalable, wherein the user-defined region includes the part of the floor plan image selected, and wherein the part of the floor plan image selected is less than all of the floor plan image and includes the corresponding location of the sensor icon;
  create an image object for the sensor icon that includes the user-defined region;
  store an association in the memory for the sensor icon that associates the sensor icon with the image object, and
  receive an alarm condition from a security sensor that corresponds to the sensor icon and, responsive thereto, display the image object on the display.

2. The security system installation tool of claim 1, wherein responsive to receiving the alarm condition, the security system installation tool controller is configured to highlight the sensor icon on the display.

3. The security system installation tool of claim 1, wherein the security system installation tool controller is configured to upload the association for the sensor icon to a security system controller.

4. The security system installation tool of claim 3, further comprising a laptop computer, a tablet, or a smart phone.

5. The security system installation tool of claim 1 further comprising a communication port, wherein the communication port is configured to communicate with a remote server.

6. The security system installation tool of claim 1, further comprising a communication port, wherein the security system installation tool controller is configured to upload the association for the sensor icon to a security system controller via the communication port.

7. The security system installation tool of claim 1, wherein the user-defined region is defined by user input defining a polygon on the floor plan image.

8. The security system installation tool of claim 7, wherein the display includes a touch screen, and wherein the user input includes user interaction with the touch screen.

9. The security system installation tool of claim 1, wherein the security system installation tool controller is configured to:
responsive to third user manipulation of the user interface, input a list of enrolled sensors and display an individual sensor icon for each of the enrolled sensors; and
responsive to fourth user manipulation of the user interface, drag the individual sensor icon for each of the enrolled sensors to locations on the displayed floor plan image that correspond to actual physical locations of the enrolled sensors.

10. The security system installation tool of claim 1, wherein the security system installation tool controller is configured to:
responsive to third user manipulation of the user interface, move, zoom, and/or resize the floor plan image when defining the user-defined region.

11. A security system controller comprising:
a user interface including a display;
a controller operatively coupled to the user interface and to a security sensor that is disposed within a building space to monitor the security sensor for an alarm condition and to display on the display a building space image of the building space, wherein, responsive to first user manipulation on the user interface, the controller places a sensor icon representing the security sensor in a virtual location on the building space image that corresponds to a physical location of the security sensor within the building space; and
a memory operatively coupled to the controller and storing an image object for the security sensor,
wherein, responsive to second user manipulation selecting a part of the building space image on the display, the controller defines a user-defined region for the sensor icon superimposed on the building space image,
wherein the controller creates the image object,
wherein the image object includes the user-defined region,
wherein a size of the user-defined region is scalable,
wherein the user-defined region is less than all of the building space image and includes the part of the building space image selected and the virtual location of the sensor icon, and
wherein, when the controller detects an alarm condition corresponding to the security sensor, the controller displays the image object on the display.

12. The security system controller of claim 11, wherein the building space image includes a floor plan.

13. The security system controller of claim 12, wherein the user-defined region includes a room or portion of the room on the floor plan.

14. The security system controller of claim 11, wherein, when the controller detects the alarm condition, the controller transmits the image object to a mobile device.

15. The security system controller of claim 14, wherein, the mobile device includes a smartphone running a security application, and wherein, responsive to receiving the image object, the security application displays the image object.

16. The security system controller of claim 11, wherein, when the controller detects the alarm condition, the controller transmits an alarm message to a remote monitoring service via a communication interface.

* * * * *